(12) United States Patent
Weis

(10) Patent No.: US 12,345,315 B2
(45) Date of Patent: Jul. 1, 2025

(54) PLANETARY ROLLER SCREW DRIVE

(71) Applicant: Schaeffler Technologies AG & Co. KG, Herzogenaurach (DE)

(72) Inventor: Sebastian Weis, Brücken (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 732 days.

(21) Appl. No.: 17/765,254

(22) PCT Filed: Oct. 1, 2020

(86) PCT No.: PCT/DE2020/100842
§ 371 (c)(1),
(2) Date: Mar. 30, 2022

(87) PCT Pub. No.: WO2021/069022
PCT Pub. Date: Apr. 15, 2021

(65) Prior Publication Data
US 2022/0364633 A1    Nov. 17, 2022

(30) Foreign Application Priority Data

Oct. 7, 2019   (DE) .......................... 102019126875.3

(51) Int. Cl.
*F16H 37/10* (2006.01)
*B62D 3/10* (2006.01)
(Continued)

(52) U.S. Cl.
CPC ............ *F16H 37/124* (2013.01); *B62D 3/10* (2013.01); *B62D 5/0424* (2013.01);
(Continued)

(58) Field of Classification Search
CPC ............... F16H 37/124; F16H 25/2252; F16H 2025/2081; F16H 2025/2096; B62D 3/10; B62D 5/0424
See application file for complete search history.

(56) References Cited

U.S. PATENT DOCUMENTS 4,000,664 A * 1/1977 Christensen ........ F16H 25/2204
74/89.44
11,827,289 B1 * 11/2023 Dehoff ................. B62D 5/0424
(Continued)

FOREIGN PATENT DOCUMENTS

CN     104015786     9/2014
DE      2602185      3/1977
(Continued)

*Primary Examiner* — Zakaria Elahmadi
(74) *Attorney, Agent, or Firm* — Volpe Koenig

(57) ABSTRACT

A planetary roller screw drive for an actuator of a rear-axle steering system of a motor vehicle, including a planetary roller support which accommodates the planetary rollers and is connected to a drive sleeve for rotation therewith, which drive sleeve is driven rotatably about the screw spindle and is mounted rotatably on a machine part by an axial angular contact roller bearing which is arranged coaxially with respect to the drive sleeve and of which the rollers are in rolling contact with angled-bearing raceways which are inclined with respect to a plane arranged transversely with respect to the axis of rotation of the drive sleeve.

17 Claims, 1 Drawing Sheet

(51) Int. Cl.
    *B62D 5/04*     (2006.01)
    *F16H 25/22*     (2006.01)
    *F16H 37/12*     (2006.01)
    *F16H 25/20*     (2006.01)

(52) U.S. Cl.
    CPC . *F16H 25/2252* (2013.01); *F16H 2025/2081* (2013.01); *F16H 2025/2096* (2013.01)

(56) References Cited

U.S. PATENT DOCUMENTS

| | | | |
|---|---|---|---|
| 2004/0095016 A1 | 5/2004 | Bayer et al. | |
| 2005/0247150 A1 * | 11/2005 | Tsubono | F16H 25/2266 74/424.92 |
| 2016/0207560 A1 | 6/2016 | Muto et al. | |

FOREIGN PATENT DOCUMENTS

| | | | | |
|---|---|---|---|---|
| DE | 102008013128 | | 9/2009 | |
| DE | 102012207005 A1 * | | 10/2013 | ........... B62D 5/0424 |
| DE | 102015206735 | | 5/2016 | |
| DE | 102015212333 A1 * | | 1/2017 | ............ F16H 25/22 |
| DE | 102017209685 | | 12/2018 | |
| DE | 102017124386 | | 1/2019 | |
| DE | 102018116867 | | 1/2020 | |
| JP | 2004338537 | | 12/2004 | |
| JP | 2014234102 A | | 12/2014 | |
| JP | 2018094934 | | 6/2018 | |
| WO | 2016150625 | | 9/2016 | |
| WO | 2020011302 | | 1/2020 | |

* cited by examiner

PLANETARY ROLLER SCREW DRIVE

CROSS-REFERENCE TO RELATED APPLICATIONS

This application is the U.S. National Phase of PCT Appln. No. PCT/DE2020/100842, filed Oct. 1, 2020, which claims priority from German Patent Application No. DE 10 2019 126 875.3, filed Oct. 7, 2019, the entire disclosures of which are incorporated by reference herein.

TECHNICAL FIELD

The present disclosure relates to a planetary roller screw drive which converts a rotary motion into a translational motion. The disclosure also relates to an actuator of a rear-axle steering system of a motor vehicle having such a planetary roller screw drive.

BACKGROUND

A planetary roller screw drive is known from DE 10 2015 206 735 B3. This planetary roller screw drive is provided with a nut arranged on a screw spindle and with planetary rollers which are arranged between the screw spindle and the nut and which mesh by means of their planetary groove profile, on the one hand, with a nut-side groove profile and, on the other hand, with a thread profile of the screw spindle. This planetary roller screw drive also has a planetary roller support having pockets, which are arranged distributed over the circumference and in which the planetary rollers are rotatably mounted about their planetary roller axis. The planetary roller support is connected for conjoint rotation with a drive sleeve that is rotatably driven about a spindle axis of the screw spindle. The drive sleeve is rotatably mounted on a machine part by means of a bearing referred to as the main bearing.

Depending on the application, considerable axial actuating forces are transmitted via the main bearing.

SUMMARY

The object of the present disclosure is to specify a planetary roller screw drive which reliably transmits axial actuating forces via the main bearing.

According to the disclosure, this object has been achieved by the planetary roller screw drive having one or more of the features disclosed herein. This planetary roller screw drive is provided with a nut arranged on a screw spindle and with planetary rollers which are arranged between the screw spindle and the nut and which mesh by means of their planetary groove profile, on the one hand, with a nut-side groove profile and, on the other hand, with a thread profile of the screw spindle. This planetary roller screw drive also has a planetary roller support having pockets, which are arranged distributed over the circumference and in which the planetary rollers are rotatably mounted about their planetary roller axis.

The planetary roller support is connected for conjoint rotation with a drive sleeve that is rotatably driven about a spindle axis of the screw spindle. This planetary roller screw drive is a true-pitch planetary roller screw drive: regardless of a possible slippage of the planetary rollers in engagement with the involved drive parts, one full rotation of the planetary roller support around the screw spindle corresponds to a relative displacement between the drive sleeve and the screw spindle by the amount of the pitch of the thread profile of the screw spindle.

The drive sleeve is rotatably mounted on a machine part by means of an axial angular contact roller bearing arranged coaxially with the drive sleeve, the rollers of which are in rolling contact with angled-bearing raceways which are inclined with respect to a transverse plane arranged transverse to the axis of rotation of the drive sleeve. The machine part can be arranged fixed to the frame and designed, for example, as a housing in which the planetary roller screw drive is accommodated.

The axial angular contact roller bearing transmits for the most part axial forces that are transmitted between the screw spindle and the machine part. These axial forces are transmitted via the planetary rollers, the nut and the drive sleeve. The rollers of the axial angular contact roller bearing are preferably cylindrical, but can alternatively also be conical. The inclination of the angled-bearing raceways with respect to the transverse plane depends on the magnitude of the radial forces to be expected. A preferred drive for planetary roller screw drives according to the invention can be a belt drive. In this case, a toothed belt, for example, loops around the drive sleeve and drives it. The tensile forces that arise in the tight side of the toothed belt are transmitted as a radial force to the drive sleeve, and from there to the machine part via the axial angular contact roller bearing. The greater the inclination of the angled-bearing raceways with respect to the transverse plane, the greater the radial forces that can be transmitted. In the case of the toothed belt drive, the radial force is only a fraction of the axial force, for example around one percent. In this case, a slight inclination of the angled-bearing raceway is possible.

The nut is preferably mounted axially on the drive sleeve by means of an axial roller bearing. The axial roller bearing does not transmit any radial bearing forces. In this way it is ensured that the radial forces acting from the outside are not transferred to the nut and the planets, but are properly conducted into the machine part by means of the axial angular contact roller bearing.

The axial angular contact roller bearing can have two bearing rings with angled-bearing raceways formed as mutually facing end faces. These bearing rings can be approximately triangular, as viewed in longitudinal section, i.e. along the axis of rotation, with bearing surfaces arranged perpendicular to one another and the angled-bearing raceway which adjoins the ends of these bearing surfaces facing away from one another.

Preferably, the drive sleeve has a sleeve and an angled-bearing disc which is arranged in a rotationally fixed manner in the sleeve and which has the inclined angled-bearing raceway. Both the sleeve and the angled-bearing disc can be manufactured in an economically advantageous manner. For example, the angled-bearing disc can be produced by stamping or extrusion, and the sleeve can be formed as a drawn part. The angled-bearing disc can be pressed into the sleeve. The angled-bearing raceway can be molded onto the angled-bearing disc.

It may be useful to arrange the angled-bearing disc with play in the axial direction and in a rotationally fixed manner in the sleeve. This development offers the advantage that during operation under an axial load the sleeve remains at least largely free of the axial load and primarily transmits the drive forces to the planetary roller support. The axial load flows—starting from an axial load acting in the screw spindle—via the planetary rollers into the nut, and from there via the axial angular contact roller bearing into the machine part, which can be a housing of an actuator—in particular a steering system of a motor vehicle—into which the planetary roller screw drive is built in.

When the planetary roller screw drive is in operation, the nut and the rotationally driven drive sleeve rotate relative to one another. An axial bearing, for example an axial roller bearing, can expediently be provided between the nut and the angled-bearing disc. If a bearing play is configured on the outside between the machine part and the drive sleeve, a bearing play of the axial bearing between the drive sleeve and the nut can be configured at the same time by means of the angled-bearing disc with axial play. It is sufficient if one angled-bearing disc has axial play. A further angled-bearing disc arranged at the other axial end of the sleeve can be fixedly connected to the sleeve, but alternatively also be arranged with axial play in the sleeve.

On the outside, the axial bearing play between the angled-bearing disc and the nut can be configured via a bearing play between the machine part and the angled-bearing disc.

The angled-bearing disc, on its end face facing away from the angled-bearing raceway, can have an axial bearing raceway, for example for an axial roller bearing. This axial bearing raceway, like the angled-bearing raceway, can be molded onto the angled-bearing disc.

The planetary roller support can be firmly connected to the angled-bearing disc on a receptacle of the angled-bearing disc, which receptacle is arranged radially within the angled-bearing raceway. The receptacle can be designed as a central opening in the angled-bearing disc, for example to be cylindrical like a bore. The planetary roller support can be provided with a cylindrical connecting piece which is pressed into this bore so that the drive force can be transmitted properly from the drive sleeve to the planetary roller support. Alternatively, the opening of the angled-bearing disc can be polygonal and the planetary roller support can be provided with a polygonal connecting piece, which is inserted into said polygonal opening so that the drive force can be transmitted properly from the drive sleeve to the planetary roller support. This alternative can be useful if axial play of the angled-bearing disc in the sleeve should be desired.

The planetary roller screw drive is preferably provided with two axial angular contact roller bearings each arranged on one of the end faces of the drive sleeve. Structurally identical axial angular contact roller bearings can be used in particular for applications in which the axial loads of the same magnitude are to be expected in both axial directions, such that economically favorable production is possible.

The planetary roller screw drive according to the invention is particularly suitable for an actuator of a rear-axle steering system of a motor vehicle. This actuator is provided with a push rod, the ends of which facing away from one another are designed for the articulation of rear wheels of the motor vehicle. In this case, the screw spindle can be part of the push rod, between the ends of which the screw spindle is formed. The push rod can have two push rod parts, between which the screw spindle is arranged and firmly connected to both push rod parts. The free ends of the push rod facing away from each other are guided out of the housing of the actuator and are provided with link heads that engage the wheel supports of the rear wheels.

This actuator is preferably provided with an electric motor and a belt drive, the toothed belt of which loops around a motor pinion of the electric motor and the drive sleeve. The belt drive with the motor pinion and the planetary roller screw drive can be arranged in the actuator housing.

The axial angular contact roller bearings described above and/or the axial roller bearings can be specially modified according to the application-related requirements. If increased friction is desired in these bearings, it is advisable to tilt the axis of rotation of one or more rollers in a known manner so that they do not intersect the axis of rotation of the bearing, but rather touch an imaginary circle that is arranged coaxially around the axis of rotation of the bearing. In this case, increased friction is generated as a function of the load in a desired manner.

BRIEF DESCRIPTION OF THE DRAWINGS

The disclosure is explained in more detail below with reference to an exemplary embodiment shown in three figures. In the figures.

DETAILED DESCRIPTION

Figure 1:
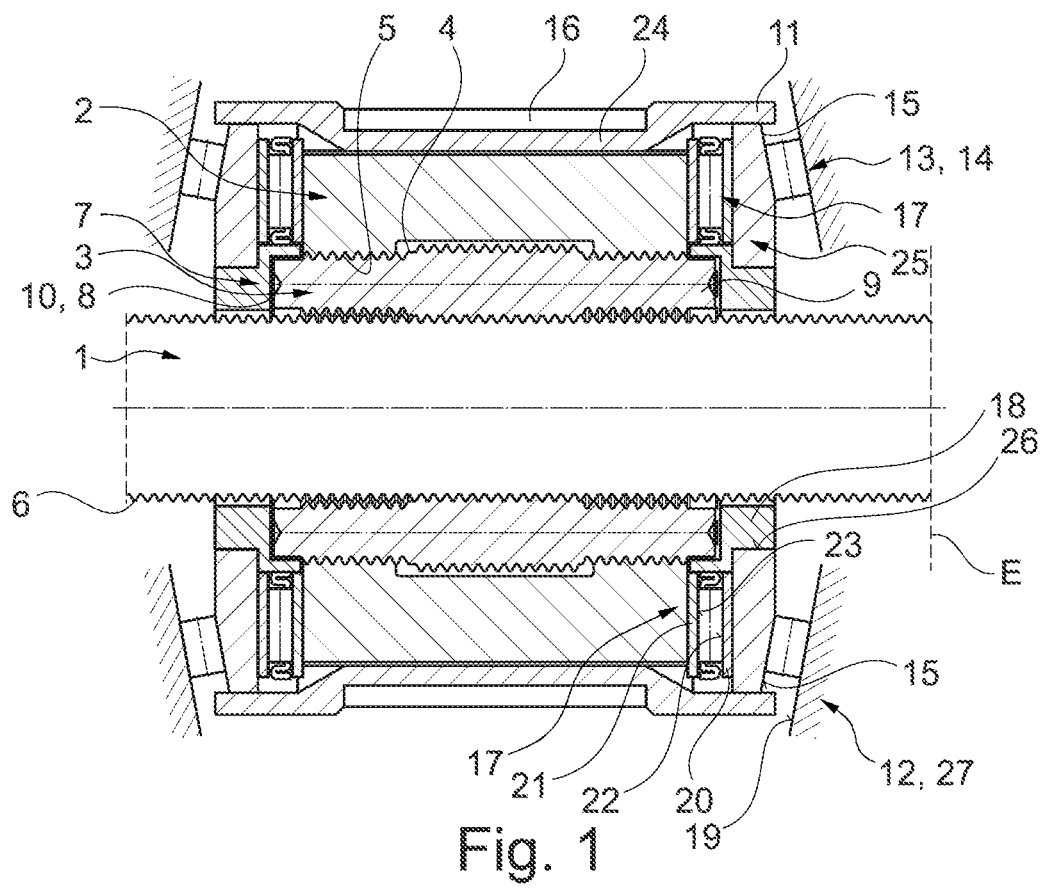
FIG. 1 shows a planetary roller screw drive in longitudinal section

The planetary roller screw drive shown in FIG. 1 is provided with a nut 2 arranged on a screw spindle 1. Planetary rollers 3 are distributed over the circumference of the screw spindle 1 between the screw spindle 1 and the nut 2. The planetary rollers 3 mesh, on the one hand, with their planetary groove profile 4 with a nut-side groove profile 5 and, on the other hand, with a thread profile 6 of the screw spindle 1 that is wound helically around the spindle axis.

This planetary roller screw drive also has a planetary roller support 7 having pockets 8, which are arranged distributed over the circumference and in which the planetary rollers 3 are rotatably mounted about their planetary roller axis. The figure clearly shows bearing journals 9 which are formed at the axial ends of the planetary rollers 3 and which engage in bearing pockets 10 of the planetary roller support 7.

The planetary roller support 7 is connected for conjoint rotation with a drive sleeve 11 that is rotatably driven about a spindle axis of the screw spindle 1. The drive sleeve 11 is rotatably mounted on a machine part 12, merely indicated here, by means of an axial angular contact roller bearing 13 arranged coaxially with the drive sleeve 11, the cylindrical rollers 14 of which are in rolling contact with angled-bearing raceways 15, 19 which are inclined with respect to a transverse plane arranged transverse to the axis of rotation of the drive sleeve.

Figure 2:
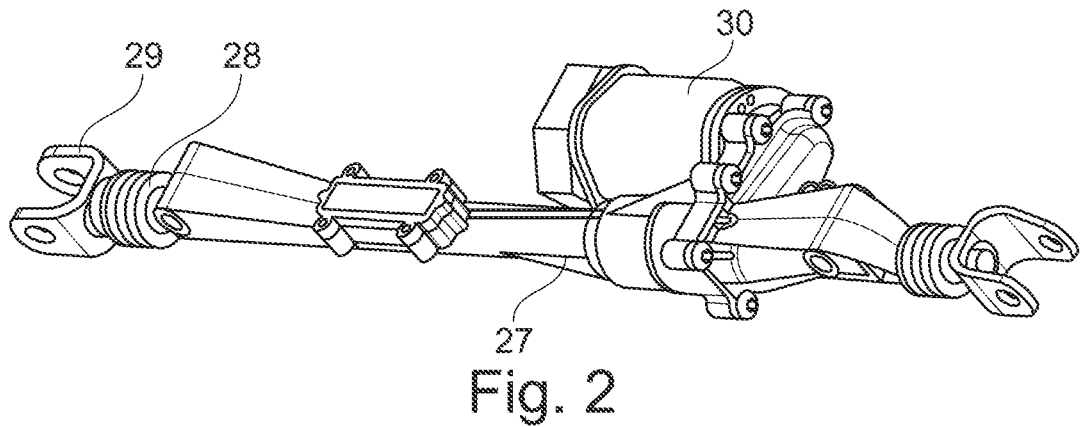
FIG. 2 shows an actuator of a rear-axle steering system of a motor vehicle.

The machine part 12 is fixed to the frame and, in the exemplary embodiment, is designed as a housing, as is clearly shown in FIG. 2.

The nut 2 is axially mounted on the drive sleeve 11 by means of an axial roller bearing 17. The axial roller bearing 17 only transmits axial bearing forces and enables radial play between the screw spindle 1, the planetary rollers 3 and the nut 2 on the one hand and the drive sleeve 11 on the other hand. The axial roller bearing 17 has two discs 20, 21 which are each provided with an axial bearing raceway 22, 23 of the axial roller bearing 17 on their mutually facing end faces. One disc 20 is supported on the drive sleeve 11 and the other disc 21 is supported on the nut 2.

The drive sleeve 11 has a sleeve 24, in each of the end-face ends of which an angled-bearing disc 25 is inserted in a rotationally fixed manner. On their end faces facing away from one another, the two angled-bearing discs 25 are provided with the angled-bearing raceways 15 of the axial angular contact roller bearing 13. The axial bearing raceways 22 of the axial roller bearings 17 can alternatively be formed on the mutually facing end faces of the angled-bearing discs 25; in this case the discs can be omitted.

The sleeve 24 is designed at its outer circumference in a central portion as a toothed belt wheel 16, around which a toothed belt of a belt drive is looped.

The planetary roller support 7 is received at both axial ends in central receptacles 26 of the two angled-bearing discs 25, said central receptacles being arranged radially inside the angled-bearing raceway 15, and is firmly connected to the angled-bearing discs 25. The receptacle 26 can be designed as a central opening in the angled-bearing disc 25, for example to be cylindrical like a bore.

The planetary roller support 7 is provided at each of its axial ends with a connecting piece 18 which is firmly inserted into said receptacle 26 so that the drive force can be transmitted properly from the drive sleeve 11 to the planetary roller support 7. For the purpose of configuring a bearing play, it can be useful if, on the one hand, there is a rotationally fixed connection between the sleeve 24 and the two angled-bearing discs 25, and, on the other hand, an axial play of the at least one angled-bearing disc 25 in the sleeve 24 is possible. A bearing play of the axial angular contact roller bearing 13 between the machine part 12 and the drive sleeve 11 can be configured on the outside by means of adjustment means (not shown) on the sides of the machine part 12. Owing to the angled-bearing disc 25 with axial play, an axial play of the axial roller bearing 17 between the nut 2 and the drive sleeve 11 is configured at the same time.

In the exemplary embodiment according to FIG. 1, the planetary roller screw drive is provided with two axial angular contact roller bearings 13 each arranged on one of the end faces of the drive sleeve 11. This planetary roller screw drive is useful when axial loads of the same magnitude are to be expected in both axial directions, and enables the use of structurally identical axial angular contact roller bearings, such that economically favorable production is possible.

FIG. 2 shows an actuator of a rear-axle steering system of a motor vehicle with the planetary roller screw drive described above, which is arranged in the machine part, designed as a housing 27, of the actuator. This actuator is provided with a push rod 28, the ends of which facing away from one another are designed for the articulation of rear wheels of the motor vehicle and are guided out of the housing 27. In the exemplary embodiment, the ends of the push rod 28 are provided with fork-like link heads 29. The ends of the push rod 28 which protrude from the housing 27 are encased by bellows collars and covered in the figure. The screw spindle 1, arranged in the housing 27, of the planetary roller screw drive forms a central portion of the push rod 28. The push rod 28 can have two push rod parts which are arranged axially one behind the other and between which the screw spindle 1 is arranged and firmly connected to the two push rod parts. Alternatively, the push rod parts and the screw spindle can be connected to one another in one piece.

Figure 3:
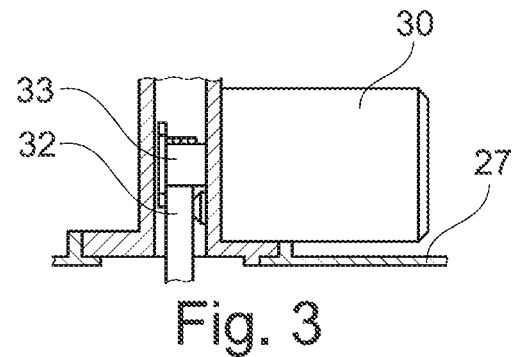
FIG. 3 shows a section from FIG. 2.

The actuator has an electric motor 30 and a belt drive 31, which is shown in detail in FIG. 3. A toothed belt 32 loops around a motor pinion 33 of the electric motor 30 as well as the drive sleeve 11, not shown here. The belt drive, the motor pinion 33 and the planetary roller screw drive are accommodated in the housing 27.

LIST OF REFERENCE SIGNS

1 Screw spindle
2 Nut
3 Planetary roller
4 Planetary groove profile
5 Nut-side groove profile
6 Thread profile
7 Planetary roller support
8 Pocket
9 Bearing journal
10 Bearing pocket
11 Drive sleeve
12 Machine part
13 Axial angular contact roller bearing
14 Roller
15 Angled-bearing raceway
16 Toothed belt wheel
17 Axial roller bearing
18 Connecting piece
19 Angled-bearing raceway
20 Disc
21 Disc
22 Axial bearing raceway
23 Axial bearing raceway
24 Sleeve
25 Angled-bearing disc
26 Central receptacle
27 Housing
28 Push rod
29 Link head
30 Electric motor
31 Belt drive
32 Toothed belt
33 Motor pinion

The invention claimed is:

1. A planetary roller screw drive, comprising:
a nut arranged on a screw spindle;
planetary rollers having a planetary groove profile arranged between the screw spindle and the nut and which mesh via the planetary groove profile with a nut-side groove profile and, with a thread profile of the screw spindle;
a planetary roller support having pockets, which are arranged distributed over a circumference thereof and in which the planetary rollers are rotatably mounted about respective planetary roller axes thereof; and
a drive sleeve that is rotatably driven about a spindle axis of the screw spindle and which is connected for conjoint rotation with the planetary roller support and is rotatably mounted on a machine part by a bearing;
wherein the bearing comprises an axial angular contact roller bearing arranged coaxially with the drive sleeve and having rollers in rolling contact with angled-bearing raceways that are arranged inclined with respect to a plane arranged transverse to the spindle axis which coincides with a rotation axis of the drive sleeve, and wherein the drive sleeve includes a sleeve and an angled-bearing disc which is arranged in a rotationally fixed manner in the sleeve and which has the inclined angled-bearing raceway.

2. The planetary roller screw drive according to claim 1, wherein the angled-bearing disc is arranged in the sleeve with play in an axial direction.

3. The planetary roller screw drive according to claim 2, wherein the nut is axially mounted on the drive sleeve by an axial roller bearing.

4. The planetary roller screw drive according to claim 3, wherein the nut is axially mounted by the axial roller bearing on the angled-bearing disc, which on an end face facing away from the angled-bearing raceway, includes an axial bearing raceway of the axial roller bearing.

5. The planetary roller screw drive according to claim 4, wherein the planetary roller support is firmly connected to the angled-bearing disc on a receptacle of the angled-bearing disc, and the receptacle is arranged radially within the angled-bearing raceway.

6. The planetary roller screw drive according to claim 1, further comprising a second axial angular contact roller bearing such that there are two of the axial angular contact roller bearings, each arranged on one end face of the drive sleeve.

7. An actuator for a rear-axle steering system of a motor vehicle, comprising:
a planetary roller screw drive comprising:
  a nut arranged on a screw spindle;
  planetary rollers having a planetary groove profile arranged between the screw spindle and the nut and which mesh via the planetary groove profile with a nut-side groove profile and, with a thread profile of the screw spindle;
  a planetary roller support having pockets, which are arranged distributed over a circumference thereof and in which the planetary rollers are rotatably mounted about respective planetary roller axes thereof; and
  a drive sleeve that is rotatably driven about a spindle axis of the screw spindle and which is connected for conjoint rotation with the planetary roller support and is rotatably mounted on a machine part by a bearing;
  wherein the bearing comprises an axial angular contact roller bearing arranged coaxially with the drive sleeve and having rollers in rolling contact with angled-bearing raceways that are arranged inclined with respect to a plane arranged transverse to the spindle axis which coincides with a rotation axis of the drive sleeve, and wherein the drive sleeve includes a sleeve and an angled-bearing disc which is arranged in a rotationally fixed manner in the sleeve and which has the inclined angled-bearing raceway; and
a push rod having ends that face away from one another and are configured for articulation of rear wheels of the motor vehicle, and the screw spindle is part of the push rod.

8. The actuator according to claim 7, further comprising an electric motor, and a belt drive having a toothed belt which loops around a motor pinion of the electric motor and the drive sleeve.

9. The actuator according to claim 8, further comprising a housing which forms the machine part, and the belt drive with the motor pinion and the planetary roller screw drive are arranged in the housing.

10. A planetary roller screw drive, comprising:
a screw spindle;
a nut arranged on the screw spindle via a plurality of planetary rollers, each having a planetary groove profile that meshes with a nut-side groove profile of the nut and with a thread profile of the screw spindle;
a planetary roller support having pockets distributed over a circumference thereof and in which the planetary rollers are rotatably mounted about respective planetary roller axes thereof;
a drive sleeve that is rotatably drivable about a spindle axis of the screw spindle and which is connected for conjoint rotation with the planetary roller support;
a machine part on which the drive sleeve and is rotatably supported by a bearing;
wherein the bearing comprises an axial angular contact roller bearing arranged coaxially with the drive sleeve and having rollers in rolling contact with angled-bearing raceways that are connected to or located on the machine part and the drive sleeve that are arranged inclined with respect to a plane arranged transverse to the spindle axis; and
wherein the drive sleeve includes a sleeve and an angled-bearing disc which is rotationally fixed to the sleeve.

11. The planetary roller screw drive according to claim 10, wherein the angled-bearing disc has one of the inclined angled-bearing raceways.

12. The planetary roller screw drive according to claim 10, wherein the angled-bearing disc is arranged in the sleeve with play in an axial direction.

13. The planetary roller screw drive according to claim 10, wherein the nut is axially supported on the drive sleeve by an axial roller bearing.

14. The planetary roller screw drive according to claim 13, wherein the nut is axially mounted by the axial roller bearing on the angled-bearing disc, which on an end face facing away from the angled-bearing raceway, includes an axial bearing raceway of the axial roller bearing.

15. The planetary roller screw drive according to claim 10, wherein the planetary roller support is firmly connected to the angled-bearing disc on a receptacle of the angled-bearing disc, and the receptacle is arranged radially within the angled-bearing raceways.

16. The planetary roller screw drive according to claim 10, further comprising a second axial angular contact roller bearing such that there are two of the axial angular contact roller bearings, each arranged on one end face of the drive sleeve.

17. The planetary roller screw drive according to claim 16, wherein the axial contact roller bearings are inclined in opposite directions.

* * * * *